US005848168A

United States Patent [19]

Shipps et al.

[11] Patent Number: 5,848,168

[45] Date of Patent: Dec. 8, 1998

[54] ACTIVE NOISE CONDITIONING SYSTEM

[75] Inventors: J. Clay Shipps, Catonsville, Md.; John E. Levreault, Jr., Boxford, Mass.

[73] Assignee: Tenneco Automotive Inc., Lake Forest, Ill.

[21] Appl. No.: 743,334

[22] Filed: Nov. 4, 1996

[51] Int. Cl.[6] .................... A01F 11/06

[52] U.S. Cl. .................... 381/71.5; 381/717; 381/718

[58] Field of Search .................... 381/71, 94, 86, 381/94.1, 71.1, 71.5, 71.7, 71.8, 71.9

[56] References Cited

U.S. PATENT DOCUMENTS

| | | | |
|---|---|---|---|
| 4,153,815 | 5/1979 | Chaplin et al. . | |
| 4,171,465 | 10/1979 | Swinbanks . | |
| 4,417,098 | 11/1983 | Chaplin et al. . | |
| 4,489,441 | 12/1984 | Chaplin . | |
| 4,490,841 | 12/1984 | Chaplin et al. . | |
| 4,550,229 | 10/1985 | Hwang | 381/194 |
| 4,566,118 | 1/1986 | Chaplin et al. . | |
| 4,665,549 | 5/1987 | Eriksson et al. . | |
| 4,805,733 | 2/1989 | Kato et al. . | |
| 4,811,403 | 3/1989 | Henricksen et al. | 381/159 |
| 4,947,435 | 8/1990 | Taylor | 381/71 |
| 5,044,464 | 9/1991 | Bremigan . | |
| 5,060,271 | 10/1991 | Geddes . | |
| 5,063,598 | 11/1991 | Geddes . | |
| 5,088,575 | 2/1992 | Eriksson . | |
| 5,097,923 | 3/1992 | Ziegler et al. . | |
| 5,119,902 | 6/1992 | Geddes . | |
| 5,229,556 | 7/1993 | Geddes . | |
| 5,233,137 | 8/1993 | Geddes . | |
| 5,272,286 | 12/1993 | Cain et all . | |
| 5,325,438 | 6/1994 | Browning et al. . | |
| 5,336,856 | 8/1994 | Krider et al. . | |
| 5,410,607 | 4/1995 | Mason et al. | 381/71 |
| 5,418,873 | 5/1995 | Eriksson . | |
| 5,469,087 | 11/1995 | Eatwell . | |
| 5,469,510 | 11/1995 | Blind et al. . | |
| 5,475,761 | 12/1995 | Eatwell . | |
| 5,499,302 | 3/1996 | Nagami et al. . | |
| 5,513,266 | 4/1996 | Zuroski . | |
| 5,524,057 | 6/1996 | Akiho et al. . | |
| 5,541,373 | 7/1996 | Cheng . | |
| 5,568,557 | 10/1996 | Ross et al. | 381/71 |
| 5,677,960 | 10/1997 | Unno et al. | 381/71.1 |

FOREIGN PATENT DOCUMENTS

| | | |
|---|---|---|
| 1357330 | 7/1974 | United Kingdom . |

*Primary Examiner*—Curtis A. Kuntz
*Assistant Examiner*—Ping W. Lee
*Attorney, Agent, or Firm*—Harness, Dickey & Pierce, P.L.C.

[57] ABSTRACT

An active noise conditioning system for use with a combustion engine exhaust system is provided. A controller receives an exhaust noise signal, along with various other feedback signals for producing an anti-noise signal in response to the input signals. An amplifier is provided for receiving and amplifying the anti-noise signal. A wave generator receives the amplified anti-noise signal and generates an audio anti-noise signal. The output of the wave generator is collocated with the exhaust pipe of the exhaust system, where the audio anti-noise signal and the exhaust noise are acoustically coupled, which effects cancelling of the exhaust noise.

50 Claims, 5 Drawing Sheets

ACTIVE NOISE CONDITIONING SYSTEM

BACKGROUND OF THE INVENTION

1. Technical Field

This invention generally relates to an active noise conditioning system. More particularly, the present invention relates to an active noise cancellation muffler system employing feedback to control the output of the system.

2. Discussion

The application of active noise cancellation (ANC) technology to eliminate various noise signals is generally known within the electronics art. ANC technology is currently used in a variety of applications including controlling noise in manufacturing processes, lowering the noise levels within cabins of propeller driven airplanes, and significantly reducing the noise levels emitted from exhaust systems of combustion engines. These systems typically operate by creating an anti-noise signal which is equal in amplitude and opposite in phase with the primary noise signal. In theory, when the primary noise signal and the anti-noise signal are acoustically combined, the two signals effectively cancel one another which significantly reduces the production of any sound. While at first glance these principles appear simple, the implementation of these systems has thus far been problematic. These problems have been further compounded when trying to integrate an active noise cancellation muffler system into the constraints of a production vehicle or production automobile exhaust system.

ANC muffler systems have the advantage of eliminating the conventional muffler from the exhaust system which in turn eliminates unwanted exhaust back pressure. A low restriction passive exhaust system is sometimes used with the ANC muffler system to attenuate high frequency noise, which is outside the ANC muffler system's frequency band of operation. The passive exhaust system also serves to minimize the effects of back pressure on the engine. This decrease in back pressure results in a substantial increase in engine horsepower.

The prior art ANC muffler systems are typically comprised of a processor based control unit, an amplifier, a DC to DC step-up power supply for powering the amplifier, a housing placed in line with the exhaust system containing one or more speakers, a microphone and a speed sensor for providing feedback to the controller, and a low restriction passive exhaust system. The controller of an ANC muffler system receives feedback from the microphone and speed sensor to determined the frequency, amplitude, and phase content of the exhaust system's noise signal. The controller generates the 180 degree out-of-phase anti-noise signal in response to the feedback. This anti-noise signal is amplified and broadcast through the outlet of the speaker enclosure. The outlet of the speaker enclosure and the exhaust tailpipe are collocated such that the acoustic coupling between the exhaust noise and the anti-noise results in a significant reduction of the total exhaust noise level. This process is continually updated to track and minimize the exhaust noise output measured by the microphone.

The power source for these ANC muffler systems is the vehicle's electrical system. As such, the maximum power produced by the system is limited to the power provided by the vehicle's electrical system. The critical requirement for an ANC muffler system, particularly for an automobile, is that the system must be capable of generating sound pressure levels equal to that of the residual exhaust noise. This must be accomplished using the vehicle's electrical system as the primary source of power.

The ANC muffler systems known within the art have several problems. First, most of these systems use a conventional Class-AB audio amplifier for generating the amplified anti-noise signal. These Class-AB amplifiers typically operate at an efficiency level of approximately 50%. Therefore, more input power is required to generate an acceptable operating power level. Second, the prior art ANC muffler systems have high voltage requirements because these systems employ speakers with higher impedance voice coils; typically two (2.0) Ohms, which draw less current. Therefore, these systems require a power supply with a step-up DC—DC converter to generate sufficient voltage to power the amplifier and speakers. These power supplies are only about 80% efficient, and therefore further reduce the electrical efficiency of the ANC muffler system. This higher power requirement also causes dissipation of additional energy, in the form of heat, which must be removed from the system to keep it operationally stable. Therefore, these systems require additional heat sinking to effectively remove this excess heat. Finally, these systems produce an analog anti-noise signal which is subject to electrical interference or noise created from within the vehicle. This in turn can cause contamination of the anti-noise signal and affect the overall ability of the ANC muffler system to cancel the exhaust noise.

Additionally, the inefficiency and size of the known ANC muffler systems and their accompanying electronics require an electronics enclosure, separate from the speaker housing, which must be mounted on the vehicle in a location which is not sensitive to the heat generated by the electronics therein. As such, the interior compartments of the vehicle or locations in the vicinity thereof are undesirable for accommodating the electronics enclosure due to the amount of heat generated by the electronics. Thus, any electronics enclosure placed underneath the vehicle must be able to withstand extreme environmental conditions. Such a requirement also causes the electronics enclosure to be significantly more expensive. Finally, these previous systems use a separate speaker housing which is in line with the vehicle's exhaust system. Such a design exposes the speakers to the heat, moisture and contaminants contained within the engine's exhaust. Further, designing a more expensive housing and speakers which are unaffected by these conditions only adds to the total cost of implementing an ANC muffler system. Accordingly, these limitations have prevented the widespread use of ANC muffler systems in mass produced vehicles.

In view of the limitations associated with the prior art, it would be desirable to provide an active noise cancellation muffler system which is significantly more efficient than those known within the prior art. It would also be desirable to provide an ANC muffler system which can optionally eliminate the need for an additional power supply to step-up and/or regulate the power received from the vehicle's battery just to power the amplifier. Furthermore, it is desirable to provide an ANC muffler system in which the signal processing electronics, amplifier, and wave generator are contained within a single enclosure. In addition, it would be desirable for such an enclosure to also provide heat sinking capabilities to the entire system. Finally, it is an object of the present invention to provide an enclosure which is not limited to a specific shape, and can be mounted in a variety of locations within or underneath the vehicle.

SUMMARY OF THE INVENTION

Pursuant to the present invention, a self-contained and highly efficient active noise cancellation muffler system is disclosed. The reduced power requirements and lower amount of heat dissipated by the present system allow all of the components to be integrated into a single enclosure. The result is numerous improvements over conventional ANC muffler systems, as well as an improved method for reducing exhaust noise.

In accordance with the teachings of the present invention, an active noise cancellation system is provided. The active noise cancellation system may be used with either a single channel or dual channel exhaust system. A controller receives an exhaust noise signal, along with various other feedback signals for producing an anti-noise signal in response to these input signals. An amplifier is provided for receiving and amplifying the anti-noise signal. A wave generator receives the amplified anti-noise signal and produces an audio anti-noise signal. The output of the wave generator is collocated with the exhaust pipe outlet of the exhaust system, where the audio anti-noise signal and the exhaust noise are acoustically coupled, which significantly reduces the exhaust noise. Also in accordance with the teachings of this invention, a method is provided for calculating the anti-noise signal and controlling the output of the amplifier using various feedback signals.

BRIEF DESCRIPTION OF THE DRAWINGS

Additional objects, advantages, and features of the present invention will become apparent from the following description and appended claims, taken in conjunction with the accompanying drawings in which:

DETAILED DESCRIPTION OF THE PREFERRED EMBODIMENTS

The following description of the preferred embodiments is merely exemplary in nature and is in no way intended to limit the invention, its applications or uses.

The present invention is directed to a device and method for reducing the exhaust noise of a combustion engine. The primary application of an active noise cancellation (ANC) muffler system is to provide a muffler system which eliminates exhaust noise without creating back pressure within the exhaust system. The benefit of such a system provides additional power to the combustion engine. The invention disclosed herein is not dependent upon an additional power supply for driving the amplifier, and especially a power supply requiring a step-up DC—DC converter. These improvements eliminate the need for additional heat sinking, and further allow all of the electrical components to be housed within a single enclosure. A unique feature of this invention is that rather than using an additional power supply to control the system's output, the amplifier output is adjusted by the controller in response to a battery feedback signal and/or a microphone feedback signal. This feature assists in further boosting the efficiency of the total system.

Figure 1:
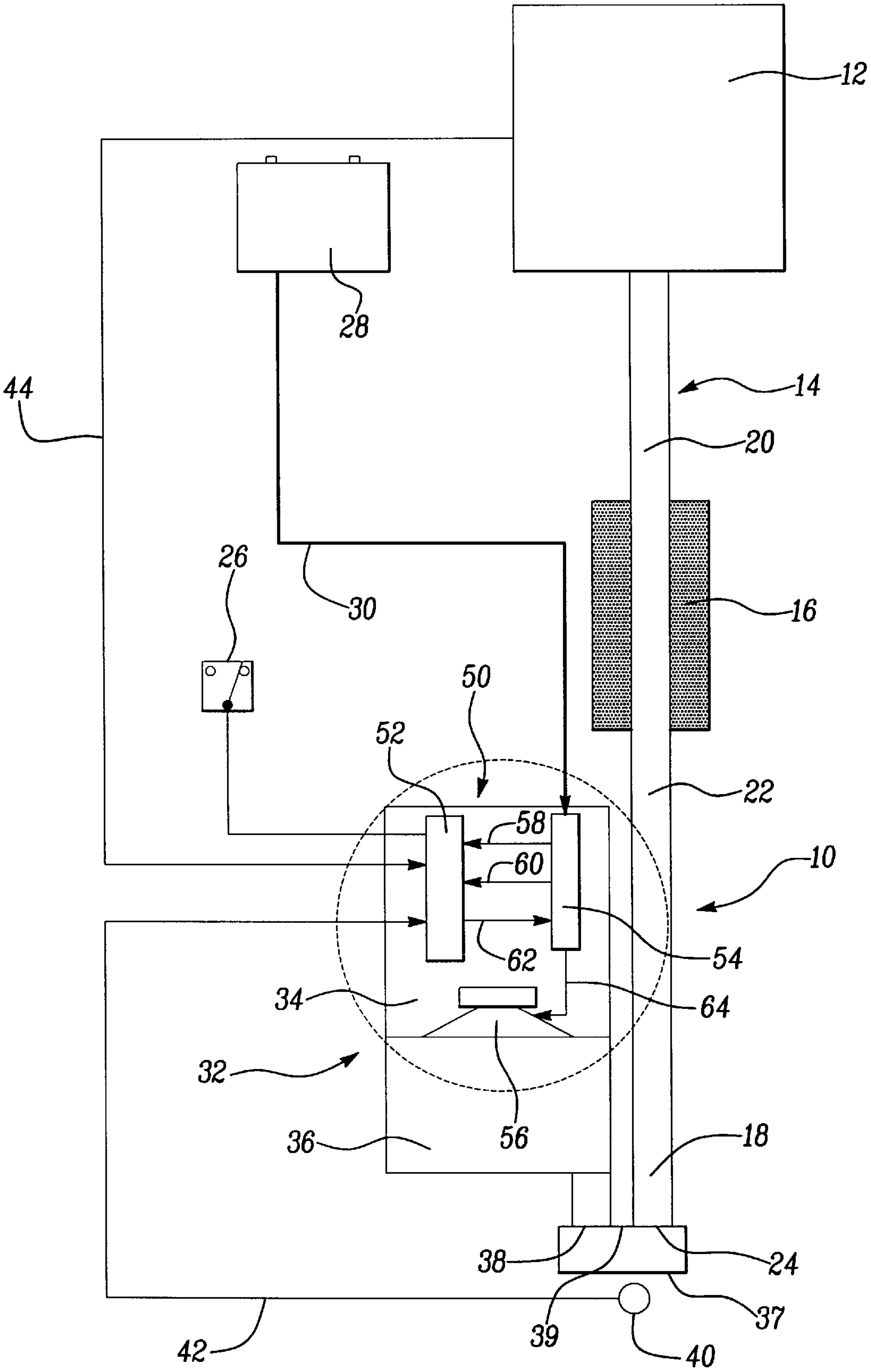
FIG. 1 is a block diagram schematic of the active noise cancellation muffler system used with a single channel exhaust system in accordance with a preferred embodiment of the present invention.

Referring now to FIG. 1, the various components of the active noise cancellation muffler system for use with a single channel exhaust system are disclosed. However, it should be noted that the system of the present invention can also be used with a multichannel system. As illustrated, muffler system 10 is used in conjunction with a combustion engine 12 having an exhaust pipe 14 connected thereto. A passive exhaust system 16 is shown connected between exhaust pipe 14 and tailpipe 18. An exhaust noise signal flowing through pre-attenuation portion 20 contains the full range of harmonic frequencies generated by the engine 12. However, exhaust noise signal passing through post-attenuation portion 22 contains little or no high frequency harmonics because these high frequencies have been removed by the passive exhaust system 16. The exhaust noise signal continues through tailpipe 18 and eventually exits through outlet 24.

ANC muffler system 10 is powered by the vehicle's electrical system 28 through a supply line 30. The vehicle's electrical system 28 is typically a 12 V DC power source. One of the key components of muffler system 10 is enclosure 32, which is preferably constructed from cast aluminum or a substitute formable metal which is capable of dissipating heat. However, enclosure 32 is not limited to cast aluminum or formable metal, but also may be constructed from various injection molded plastics or resin, having a heat sink molded therein. Accordingly, enclosure 32 may serve a dual purpose of housing all of the electronics and functioning as a heat sink for the electronics. While many of the advantages of enclosure 32 will be described in more detail herein, a particularly unique feature is that enclosure 32 it is not limited to a particular shape. More particularly, enclosure 32 can be formed into almost any shape, thus allowing the enclosure 32 to be located almost anywhere on the vehicle.

Enclosure 32 includes an electronics portion 34 and a tuned acoustic chamber 36. The anti-noise signal which is produced within tuned acoustic chamber 36 is emitted from the enclosure outlet 38. As seen in FIG. 1, the exhaust noise signal emitted from the tailpipe outlet 24 and the anti-noise signal emitted from the enclosure outlet 38 are acoustically coupled at the location of those outlets, which serves to effectively cancel the exhaust noise signal.

Figure 7:
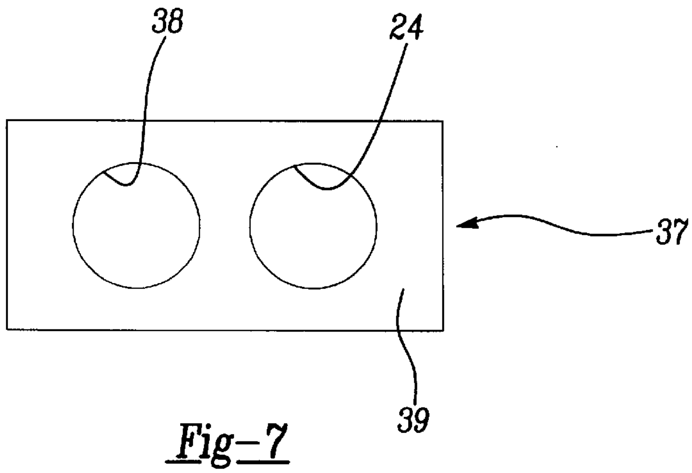
FIG. 7 shows the coupling box used in conjunction with a preferred embodiment of the present invention.

As seen in FIGS. 1 and 7, the acoustic coupling of the exhaust noise signal and the anti-noise signal may be enhanced by a coupling box 37. As disclosed, the tailpipe outlet 24 and the enclosure outlet 38 feed through openings formed in the rear wall 39 of the coupling box 37. The end portion of coupling box 37 which is opposed to the rear wall 39 is open to the atmosphere, allowing the acoustically coupled signals to freely escape.

Any residual noise which remains from the acoustic coupling of these two signals is received by a microphone 40, positioned in the vicinity of the outlets 24, 38. Microphone 40 may also be positioned within the coupling box 37. Preferably, microphone 40 produces an analog exhaust noise feedback signal 42 which is transmitted back to a controller

52. However, a digital microphone or other similar transducer which produces a digital signal could be substituted for microphone 40. Such a device would have the advantage of shielding the digital feedback signal from outside noise. The exhaust noise feedback signal 42 represents residual error between the exhaust noise signal and the anti-noise signal.

Exhaust system 10 also utilizes a synchronization signal 44 produced by combustion engine 12. The synchronization signal represents the real time rotational speed or frequency of the combustion engine 12. This signal assists the ANC muffler system 10 in predicting the range of frequencies contained within the exhaust noise signal emitted from the tailpipe outlet 24. The advantages of employing synchronization signal 44 will become apparent as it is discussed in further detail below.

The electronics portion 34 of enclosure 32 houses the signal processing electronics 50 of the muffler system 10. More particularly, the signal processing electronics 50 include a controller 52 which receives the exhaust noise feedback signal 42 and the synchronization signal 44 as input signals. Controller 52 is coupled to an amplifier 54 which produces an amplified anti-noise signal to a wave generator 56 via amplifier output 64. Amplifier 54 is powered by the vehicle's electrical system 28 via power line 30. As disclosed, amplifier 54 is also capable of providing a 5 V DC power source 58 to the electronics contained within controller 52. The power received on line 30 is passed through amplifier 54 as an additional input or feedback signal to controller 52. This battery feedback signal 60 can be monitored by the electronics within controller 52. The battery feedback signal 60 can be used by controller 52 to continually adjust the output of the amplifier 54. This is one of several features which are unique to this invention. One skilled in the art will appreciate that during typical operating conditions, the voltage output by the vehicle's electrical system 28 will vary significantly from 12 volts. This variation is caused both by the vehicle's alternator providing excess electricity, and other electrical systems within the vehicle drawing electricity. As such, controller 52 is capable of monitoring this fluctuation in the output voltage from the vehicle's electrical system 28, and is further capable of adjusting the system's output in response to these constant changes.

In response to the microphone feedback signal 42, the controller 52 calculates and generates an anti-noise signal which is presented on control output 62 and provided to the amplifier 54. The amplifier 54 provides additional gain to the anti-noise signal thereby producing an amplified anti-noise signal on amplifier output 64. This output is coupled to a wave generator 56 for producing an audio anti-noise signal into tuned acoustic chamber 36. One skilled in the art will appreciate that while at least one speaker driven by a voice coil is preferred, wave generator 56 can also include, but is not limited to, a piezoelectric device, or a piezoceramic device. A preferred speaker for wave generator 56 is a 0.5 Ohm speaker which draws more electrical current, but utilizes a lower voltage to generate the requisite power level. Such an implementation allows the power supply, necessary in the prior art systems, to be eliminated in the present invention. This is possible because the 0.5 Ohm speaker eliminates the need for a stepped-up voltage. This audio anti-noise signal produced by wave generator 56 is emitted from enclosure outlet 38 and is acoustically coupled with the exhaust noise signal emitted from outlet 24 as described above. In view of this description, one skilled in the art will appreciate that controller 52 is constantly receiving a real-time, updated, time variant error signal, or microphone feedback signal 42 produced by microphone 40. Accordingly, controller 52 is capable of updating the audio anti-noise signal in real time for effectively eliminating the audible exhaust noise level emitted from the exhaust system.

Figure 2:
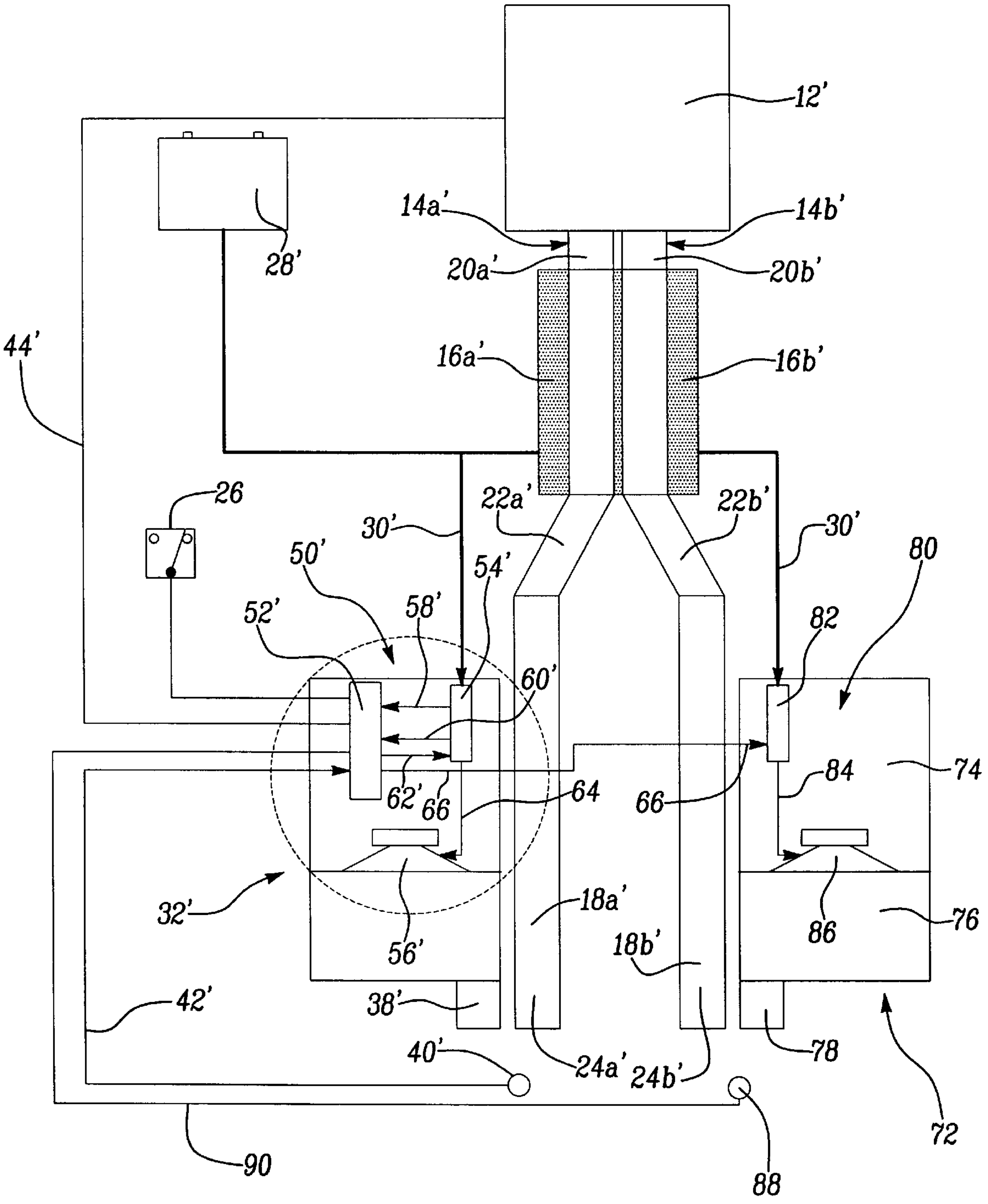
FIG. 2 is a block diagram schematic of the system in conjunction with a dual channel exhaust system in accordance with a preferred embodiment of the present invention.

Referring now to FIG. 2, the active noise cancellation muffler system is disclosed for use in conjunction with a dual channel exhaust system. In operation, dual channel ANC exhaust system 11 operates in a substantially similar manner, that includes substantially the same components as the single channel ANC muffler system 10 of FIG. 1. As disclosed, dual channel ANC muffler system 11 includes a combustion engine 12' connected to a pair of exhaust pipes 14*a*', 14*b*'. A two channel passive exhaust system 16*a*', 16*b*' is also provided, and differs only in that it is capable of simultaneously attenuating the high frequency harmonic components received from the pair of exhaust pipes 14*a*', 14*b*'. As previously discussed, the exhaust noise signal flowing through pre-attenuation portions 20*a*', 20*b*' contains the full range of harmonic frequencies generated by the engine 12'. The exhaust noise signal passing through the post-attenuation portions 22*a*', 22*b*' contains little or no high frequency components, as they have been removed by the dual channel passive exhaust system 16*a*', 16*b*'. The exhaust noise signal continues through a pair of tailpipes 18*a*', 18*b*' and is emitted from a pair of tailpipe outlets 24*a*', 24*b*'.

In this embodiment, enclosure 32' along with its components are substantially similar to enclosure 32 described above. Additionally, the signal processing electronics 50' disclosed in this alternate embodiment, are substantially similar to those disclosed by signal processing electronics 50, with only the addition of duplicate components and outputs to accommodate the second channel. As clearly see in FIG. 2, controller 52' receives synchronization signal 44' along with microphone feedback signal 42' produced by microphone 40'. However, controller 52' also receives a second microphone feedback signal 90 produced by second microphone 88. In addition to producing a first control output 62' to first amplifier 54', controller 52' additionally produces a second control output 66 which is provided to a second amplifier 82. The output from amplifier 82 is provided to a second wave generator 86 via amplifier output 84.

The significant difference between the single channel ANC muffler system 10 of FIG. 1 and the dual channel ANC muffler system 11 of FIG. 2 is the addition of a second enclosure 72. As disclosed, enclosure 72 is substantially similar to enclosure 32', and includes an electronics portion 74 and a tuned acoustic chamber 76. The anti-noise signal generated by enclosure 72 is emitted from enclosure outlet 78. Enclosure 72 also includes signal processing electronics 80 for use with the second channel. Signal processing electronics 80 include slightly fewer components than signal processing electronics 50'. As disclosed, the dual channel muffler system 11 requires only a single controller 52'. As such, signal processing electronics 80 require only a second amplifier 82 and a second wave generator 86 driven by second amplifier output 84.

Figure 3:
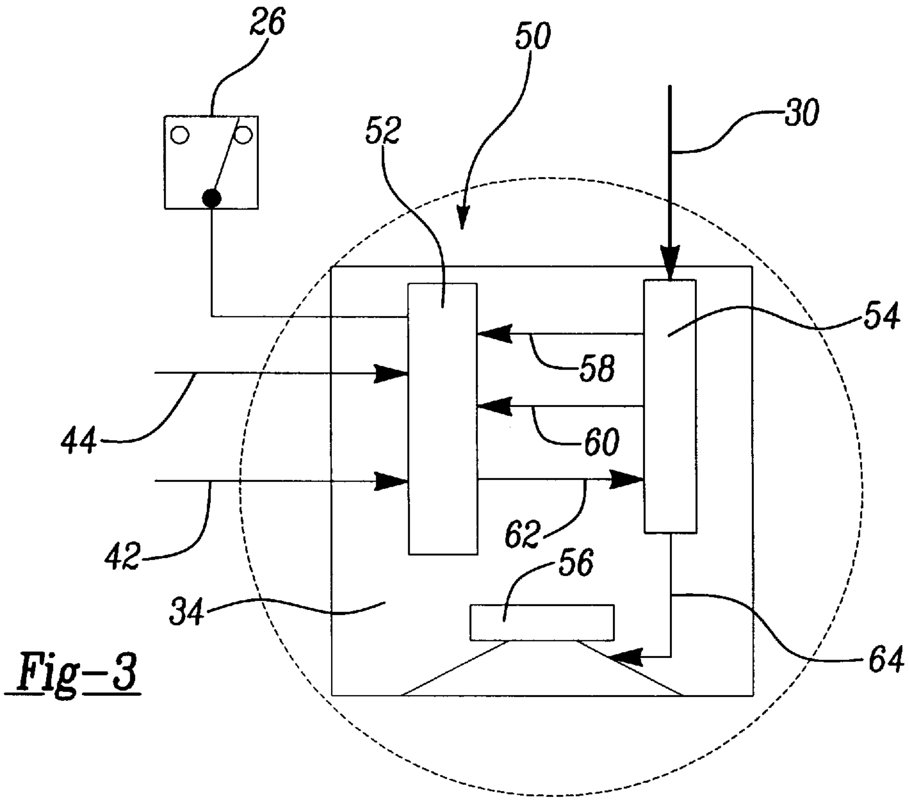
FIG. 3 is an enlarged block diagram of the electronics associated with the single channel exhaust system in accordance with a preferred embodiment of the present invention.
Figure 4:
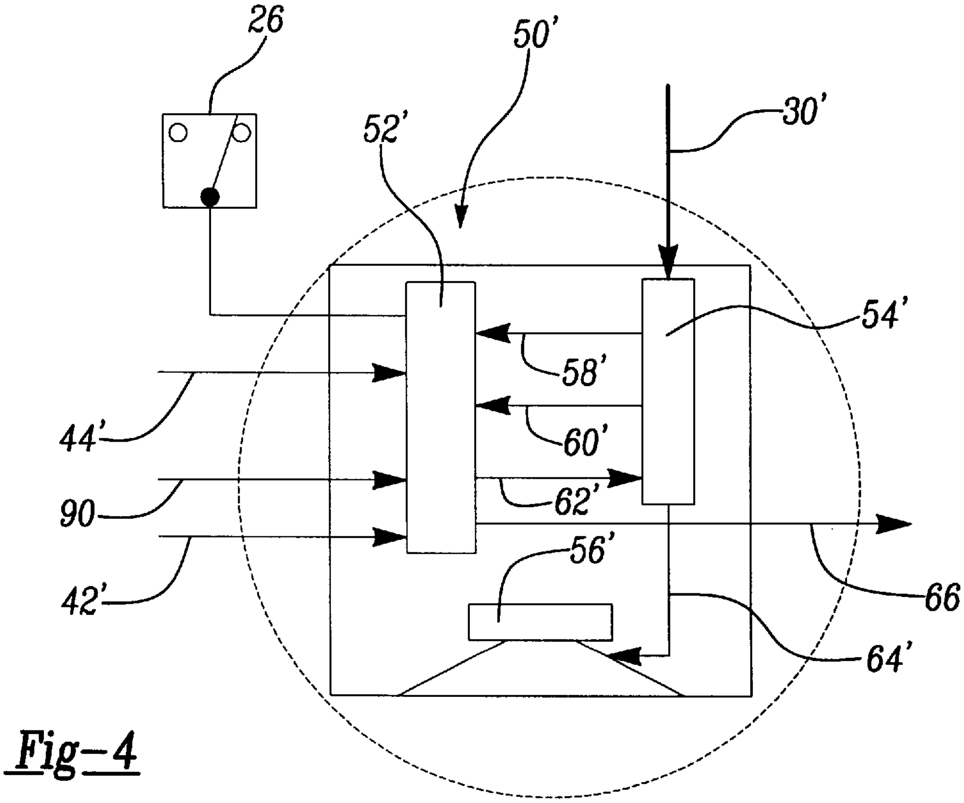
FIG. 4 is an enlarged block diagram of the electronics used with a dual channel exhaust system in accordance with a preferred embodiment of the present invention.

Referring now to FIGS. 3 and 4, the subtle differences between signal processing electronics 50 and 50' can be seen with more particular detail. FIG. 3 discloses the signal processing electronics 50 used in conjunction with the single channel muffler system 10. FIG. 4 discloses the signal processing electronics 50' used in conjunction with the dual channel muffler system 11. When viewing FIG. 4 in detail, one skilled in the art will appreciate that controller 52' includes the same inputs as controller 52, with the addition of second microphone feedback input 90 as well as the second controller output 66. In the embodiment disclosed by FIG. 4, controller 52' is capable of monitoring the feedback from each microphone 40', 88 associated with each tailpipe outlet 24*a*', 24*b*' in addition to monitoring the battery feedback signal 60' and synchronization signal 44'. Controller 52' is also capable of controlling a second amplifier 82 and wave generator 86 combination. One skilled in the art will readily appreciate that a single controller is capable of monitoring the various feedback signals and producing individual anti-noise signals for either a single channel or dual channel ANC exhaust system. It should also be particularly noted that due to the high efficiency of the present invention, all of the electronics 50, including the amplifier 54, can be contained within the electronics portion 34 of the enclosure 32 and/or 72. The low amount of heat dissipated by the amplifier 54 and the absence of an additional power supply also make such a self-contained system possible. Alternatively, the efficiency of the present invention can accommodate a power supply (not shown) and still provide a system in which all of the electronics are contained within a single enclosure 32, 72. In either situation, any necessary heat sinking can be accommodated by the enclosure 32, 72 itself.

Figure 5:
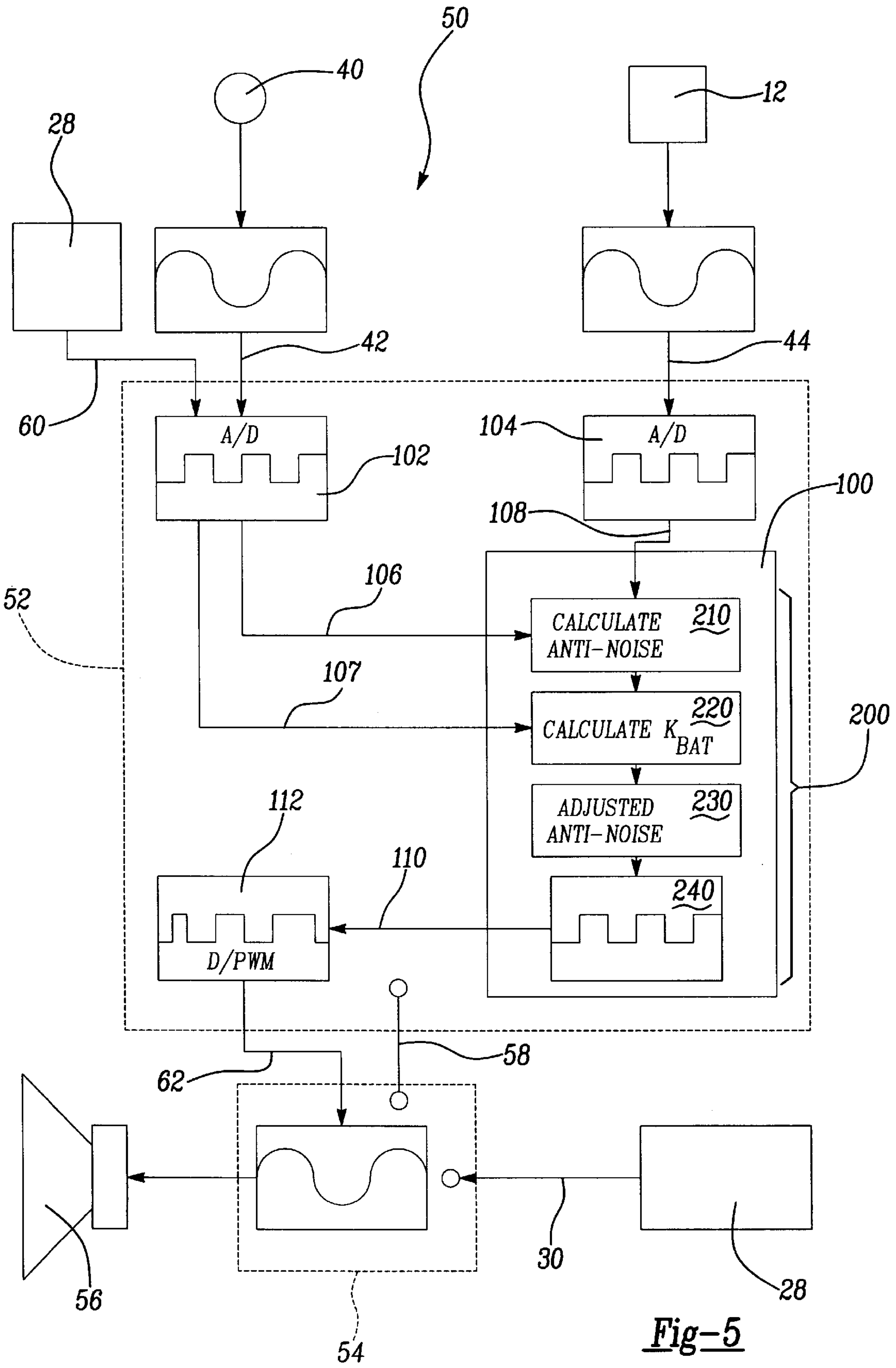
FIG. 5 is a block diagram showing the signal flow of the system and the controller's electrical components in accordance with a preferred embodiment of the present invention.

Referring now to FIG. 5, the signal flow of the feedback signals and output signals of the active noise cancellation muffler system is presented. According to this preferred embodiment, signal processing electronics 50 include the components described above. More particularly, the components representing controller 52 are disclosed via a block diagram in FIG. 5. As illustrated, controller 52 includes a digital signal processor 100 which is connected to and receives input from a multichannel analog-to-digital converter 102, and synchronization signal one-shot converter 104. A representative component for digital signal processor 100 is the DSP manufactured by Analog Devices, Model No. ADSP2181BS-115. An exemplary component for the multichannel A/D converter 102 is Model No. TLC2543, manufactured by Texas Instruments, and an exemplary component for one-shot 104 is Model No. 74HC221 manufactured by National Semiconductor. More particularly, AND converter 102 receives multiple analog input signals and produces multiple digital output signals. As disclosed, A/D converter 102 receives an analog feedback signal 42 from microphone 40, an analog feedback signal 60 from the vehicle's electrical system 28, and optionally a second analog feedback signal 90 from microphone 88 (not shown). These analog signals 42, 60, and 90 are converted into digital microphone feedback signal 106, digital battery feedback signal 107, and a digital second microphone feedback signal (not shown) respectively. In a similar fashion, one-shot converter 104 receives an analog synchronization signal 44 from engine 12 and converts this analog signal to a digital synchronization signal 108. Alternatively, a digital synchronization signal 108 could be received directly from the vehicle's electrical control system. The frequency of digital synchronization signal 108 represents the rotational frequency of the combustion engine 12, and thus represents the harmonic frequency components contained in the exhaust noise signal. Supplying a synchronization signal to controller 52 has the advantage of providing advanced frequency information to the control system algorithm 200. Digital signals 106, 107 and 108 are provided as inputs to digital signal processor 100 for further processing by the control algorithm 200.

Digital signal processor 100 is responsible for monitoring the various inputs of the system, and producing an anti-noise signal in digital format. The digital anti-noise signal 110, produced by the digital signal processor 100 is provided to a digital-to-pulse width modulation converter (DIPWM) 112. D/PWM converter 112 transforms the digital anti-noise signal 110 into a pulse width modulation signal 62 which is provided to amplifier 54. A preferred D/PWM converter 112 is that manufactured by Harris Semi-Conductor, Model No. CD68HC68. As disclosed, amplifier 54 (and amplifier 82, not shown in FIG. 5) is a Class-D amplifier which is designed to receive a digital pulse width modulation signal as its input. Amplifier 54 has several advantages over amplifiers used in previous systems. The prior art systems typically employ a Class-AB amplifier to reproduce the analog anti-noise signal. The use of such an analog amplifier subjects the anti-noise signal to additional interference or corruption. In addition, most Class-AB amplifiers are only about 50% efficient. Thus, this amplifier required additional power as well as additional heat sinking to dissipate the excessive heat generated.

The amplifier 54 of the present invention overcomes both of these significant problems. First, Class-D amplifiers are designed to receive a digital input signal. As such, the digital anti-noise signal 110 is almost completely isolated from external noise which could potentially corrupt the signal quality. Secondly, Class-D amplifiers using high current MOSFET technology operate at efficiencies above 90%. A representative Class-D amplifier chip for use in accordance with this invention is EL7661, manufactured by Elantic. Additionally, the significantly higher efficiency of such a Class-D amplifier requires less power and less heat sinking. Further, the combination of a Class-D amplifier and a low impedance speaker does not require a separate power supply. Thus, the Class-D amplifier can be powered directly from the vehicle's electrical system 28. Because of the smaller heat sinking requirements, the system of the present invention can use the enclosure 32 as its only source for heat sinking.

With continued reference to FIG. 5, the algorithm 200 implemented by DSP 100 is disclosed with more particular detail. A suitable control algorithm is that disclosed by U.S. Pat. No. 5,469,087 to Eatwell, issued on Nov. 21, 1995, which is expressly incorporated herein by reference. However, a variation on the Eatwell control algorithm which comprises the control algorithm 200 of the present invention implemented by DSP 100 is provided below. One skilled in the art will appreciate that many variations of the control algorithm 200 can be implemented for controlling the ANC muffler system presented herein.

Generally, algorithm 200 receives the digital feedback signals produced by the synchronization signal one-shot converter 104 and the multichannel microphone feedback signal and battery feedback signal A/D converter 102. From these inputs, the algorithm calculates the anti-noise signal, including its phase and frequency components, as shown in block 210. The algorithm receives the battery feedback signal 60 in order to calculate the battery gain factor denoted $K_{bat}$ at block 220. Upon combining the information produced by block 210 and block 220, the algorithm calculates an adjusted anti-noise signal at block 230. The gain of this anti-noise signal is adjusted in response to the continually varying amount of power produced by the vehicle's electrical system 28. Alternatively, the gain of the anti-noise signal may be adjusted in response to the microphone feedback signal 42. The continually updated digital anti-noise signal is represented by block 240. As discussed previously, the output of DSP 100 is a purely digital signal 110 which is provided to D/PWM converter 112 and transformed into a pulse width modulation signal 62. This PWM signal 62 is fed directly into the input of amplifier 54. In operation, the active noise cancellation muffler system, and more particularly the algorithm 200 of controller 52, performs these operations on a continual and real time basis. Accordingly, the benefits of this improved system are apparent when compared to previous systems known within the prior art.

More specifically, the gain of the amplifier 54 is dependent upon the supply voltage V from the vehicle's electrical system 28. The controller output 110 must be adjusted to account for any variation in this voltage V, otherwise, the anti-noise signal will not have the correct power level required to cancel the exhaust noise.

As is known in a feedback control system, the feedback gain is set to give a high degree of attenuation without causing instability. Since the amplifier 54 is part of the feedback loop, any change in the amplifier gain should be accounted for if optimal performance is to be maintained. For example, if the amplifier gain becomes much higher than the optimum gain, the system may become unstable. If the amplifier gain becomes much lower than the optimum gain, poor performance will result.

The same is true of an adaptive control system for an active noise conditioning system. The adaptation step size performs the same role as the feedback gain (see Eatwell, "Tonal Noise Control Using Harmonic Filters," Proceedings of Active 95, Newport Beach, Calif., for example). Hence, it is desirable that the system loop gain be made insensitive to supply voltage variations, or that the control algorithm be modified to account for the variations.

The system transfer function is the response of the loop from the controller output 62 to the controller input 42 at a given frequency. In one embodiment of the present invention, a variable gain G is inserted at some point in this loop. The gain should be selected according to the following criteria.

During a calibration phase, the gain is set to $G_0$ and the voltage supplied to the amplifier 54 is $V_0$. The transfer function $A(\omega, G, V)$ depends upon the frequency $\omega$, the current gain G and the current voltage V. This is related to the transfer function at calibration by $$A(\overline{\omega}, G, V) = \frac{G}{G_0} A(\overline{\omega}, G_0, V) = \frac{V}{V_0} \frac{G}{G_0} A(\overline{\omega}, G_0, V_0)$$

From this expression it is clear that the transfer function will be independent of the voltage provided that $$\frac{V}{V_0} \frac{G}{G_0} = 1$$

or $$G = G_0 \frac{V_0}{V}$$

In other words, the gain should be chosen to be inversely proportional to the vehicle's electrical system 28 supply voltage V. This ensures that the control system response will be insensitive to variations in the supply voltage of the vehicle's electric al system 28. In these expressions, $V_0/V$ is the same as $K_{bat}$.

Since the supply voltage of the vehicle's electrical system 28 may be continuously varying, it is necessary for the controller 52 to continuously monitor the supply voltage and continuously vary the gain of the anti-noise signal provided to the amplifier 54.

The gain can be applied at any point in the control loop. For example, it can be applied to the digitized microphone signal 106 or to the digital signal processor output signal 110. Alternatively, it can be applied as part of the output calculation 210. As an example of this, a modification in the Harmonic Filter algorithm U.S. Pat. No. 5,469,087 will now be described. The disclosure of U.S. Pat. No. 5,469,087 is expressly incorporated herein by reference. In the Harmonic Filter algorithm the output harmonic amplitudes Y are updated at the nth iteration according to equation 12 of U.S. Pat. No. 5,469,087, namely $$Y_k^n = (1-\lambda)Y_k^{n-1} - \mu B(\omega) R_k^{n-1}$$

where k is the harmonic number, p the step size, $B(\omega)$ is related to the system transfer function and R is the harmonic transform of the residual microphone signal at this harmonic. In the control algorithm 200 of the present invention, this algorithm may be replaced by $$Y_k^n = (1-\lambda)Y_k^{n-1} - \mu G B(\omega) R_k^{n-1}$$

where the gain G is varied in response to the battery voltage level. Notice that the gain can be considered as being applied to the step size $\mu$ or to the residual R. Alternatively, the output harmonic amplitude Y could be multiplied by the gain G before being passed to the output modulator bank 240. In a related embodiment, the gain is applied to the analog microphone signal 42 and in a still further embodiment the gain is applied to the PWM output signal 62.

Since the inclusion of the variable gain makes the ANC muffler system of the present invention insensitive to voltage variations, the disclosed technique can be used with control algorithms other than the Harmonic Filter. For example, in a time domain adaptive algorithm such as that described in U.S. Pat. No. 5,475,761 to Eatwell, issued Dec. 12, 1995, which is also incorporated herein by reference, the controller output 62 is obtained by filtering reference signals (signals 13 and 19 in FIG. 6 of U.S. Pat. No. 5,475,761). These signals are obtained from microphone signals (4 and 9) by subtracting estimates (11 and 17) of the signal components due to the action of the anti-noise. If the gain of the system were to vary, the gain of the compensation filters C and D should be varied correspondingly. In addition, the step-sizes, $\mu B$ in equation 10 and $\mu A$ in equation 12, should be adjusted as in the Harmonic Filter case. Alternatively, the variable gain $$G = G_0 \frac{V_0}{V}$$

can be applied to the signal supplied to the loudspeaker (7) or to the microphone signals (4 and 9). This gain makes the ANC muffler system insensitive to battery voltage variations and so modification of the compensation filter of the update step sizes is not required. From the above descriptions it will be clear to those skilled in the art how similar modifications may be made to other control algorithms.

Figure 6:
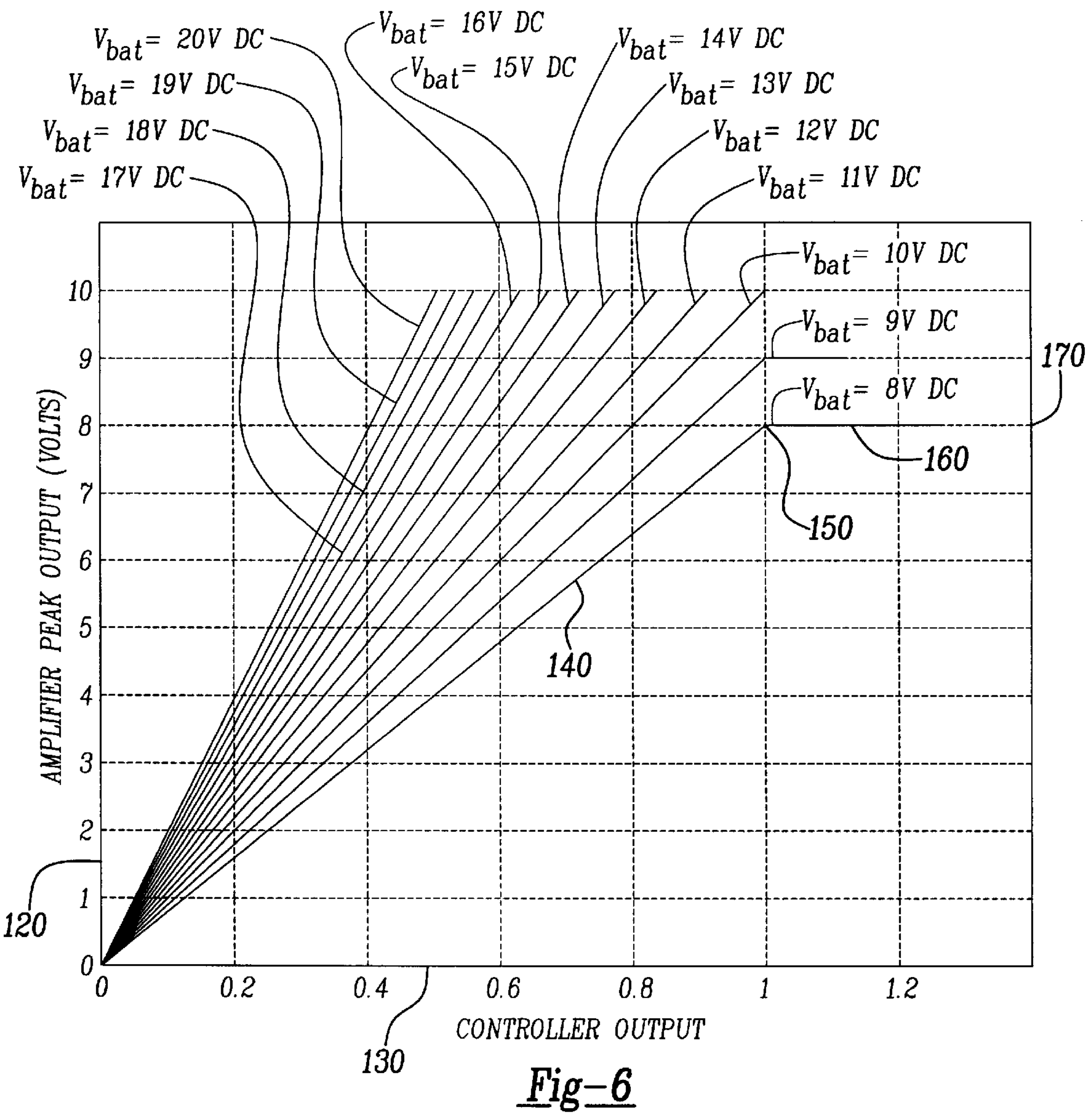
FIG. 6 is a graphical representation of the amplifier peak output as a function of the battery dependent controller output in accordance with a preferred embodiment of the present invention.

Referring now to FIG. 6 of the present application, a graphical representation of the amplifier's peak output as a function of battery dependent controller output is disclosed. As seen in the graph, the vertical axis 120 represents the amplifier peak output in Volts. The horizontal axis 130 represents the controller output. The graph depicts this function as being linear 140 up to the point where the controller's output reaches the maximum voltage level provided by the battery 150. At this point 150, the amplifier becomes saturated 160 and cannot produce a higher peak output than the battery voltage provided to the amplifier 170.

One skilled in the art will appreciate that the present invention can be used in conjunction with any single channel or dual channel combustion engine exhaust system. However, the ANC muffler system disclosed is especially suitable for use with high performance vehicles utilizing a dual channel exhaust system. Such an application will assist in maximizing the vehicle's engine output while minimizing the exhaust noise. The system of the present invention can be installed during the factory production of the vehicle. Alternatively, the system can be added to the vehicle as an aftermarket component. While the foregoing discussion discloses an active noise conditioning system used in conjunction with cancelling the exhaust noise signal of a combustion engine, the scope of the present invention is not limited to such an application. One skilled in the art will recognize that the active noise conditioning system disclosed herein is suitable for cancelling a much wider variety of noise signals.

Additionally, it is within the scope of the present invention to provide a selectively adjustable switch 26, see in FIGS. 1 through 4, located within the passenger compartment of the vehicle for adjusting the operation of the ANC muffler system. This includes, but is not limited to, varying the anti-noise signal in a positive or negative fashion, and enabling or disabling the electronic circuitry of the ANC muffler system of the present invention. This switch 26 may optionally include a display for presenting information relating to the operation of the ANC muffler system to a vehicle occupant. The switching capability of the present invention can be utilized with either the factory installed device, or the aftermarket device.

The foregoing discussion discloses and describes exemplary embodiments of the present invention. One skilled in the art will readily recognize from such discussion, and from the accompanying drawings and claims, that various changes, modifications, and variations can be made therein within departing from the spirit and scope of the invention as defined in the following claims.

What is claimed is:

1. An active noise conditioning system comprising:

a controller for receiving an acoustic feedback signal and a power source feedback signal and producing an anti-noise signal for cancelling an exhaust noise signal, said controller continually adjusting said anti-noise signal in response to fluctuations in said acoustic feedback signal and said power source feedback signal; and a wave generator coupled to said controller for generating an audio anti-noise signal, said wave generator and said controller being contained within an enclosure having an outlet collocated with an exhaust pipe outlet.

2. The system of claim 1, including an amplifier coupled between said controller and said wave generator for receiving said anti-noise signal and producing an amplified anti-noise signal.

3. The system of claim 2, wherein said controller, said amplifier, and said wave generator are contained within said enclosure.

4. The system of claim 3, further comprising a combustion engine having an exhaust system, and wherein said enclosure is separate from said exhaust system.

5. The system of claim 3, wherein said enclosure is metal and dissipates heat from electronic circuitry contained therein.

6. The system of claim 2, wherein said amplifier receives power from a DC battery recharged in conjunction with a combustion engine.

7. The system of claim 2, wherein said amplifier is a Class-D amplifier.

8. The system of claim 2, wherein said amplifier is a pulse width modulation amplifier.

9. The system of claim 1, wherein said controller adjusts an output of said wave generator in response to said acoustic feedback signal.

10. The system of claim 1, wherein said power source feedback signal is a battery feedback signal.

11. The system of claim 1, wherein said acoustic feedback signal is a residual exhaust noise signal.

12. The system of claim 1, including a microphone for receiving a residual exhaust noise signal and producing said acoustic feedback signal.

13. The system of claim 1, further comprising an operator-actuated switch for selectively adjusting operation of said controller.

14. The system of claim 1, wherein said controller receives a synchronization signal produced by a combustion engine.

15. The system of claim 1, including a passive exhaust system for removing a range of high frequency signal components from said exhaust noise signal.

16. The system of claim 1, wherein said controller includes a digital signal processor.

17. The system of claim 1, wherein said anti-noise signal comprises a digital pulse width modulation signal.

18. The system of claim 1, wherein said wave generator includes at least one speaker driven by a voice coil.

19. The active noise conditioning system of claim 1 wherein the power source feedback signal is monitored by the controller for continually adjusting an amplitude level of the anti-noise signal.

20. The active noise conditioning system of claim 19 wherein the controller increases the amplitude level of the anti-noise signal in response to a decrease in a voltage level of the power source feedback signal, and the controller decreases the amplitude level of the anti-noise signal in response to an increase in a voltage level of the power source feedback signal.

21. The active noise conditioning system of claim 19 wherein a vehicular battery system produces the power source feedback signal received by said controller.

22. In an exhaust system coupled to a combustion engine, an active noise cancellation system comprising:

a controller for receiving an exhaust noise signal and a power source feedback signal for producing an anti-noise signal, said controller continually adjusting said anti-noise signal in response to fluctuations in said exhaust noise signal and said power source feedback signal;

a microphone coupled to said controller for receiving a residual noise signal and producing said exhaust noise signal;

an amplifier for receiving said anti-noise signal and producing an amplified anti-noise signal, and wherein said controller adjusts a power output level of said amplifier in response to said power source feedback signal; and a wave generator coupled to said amplifier and having a voice coil for generating an audio anti-noise signal, said wave generator mounted within an enclosure having an outlet collocated with an exhaust pipe outlet;

whereby said audio anti-noise signal and said exhaust noise signal are acoustically coupled for canceling said exhaust noise signal.

23. The system of claim 22, wherein said controller, said amplifier, and said wave generator are contained within said enclosure.

24. The system of claim 22, wherein said enclosure is separate from said exhaust system.

25. The system of claim 22, wherein said enclosure is metal and dissipates heat from electronic circuitry contained therein.

26. The system of claim 22, wherein a vehicular battery system produces the power source feedback signal received by said controller.

27. The system of claim 22, wherein a synchronization signal produced by said combustion engine is provided to said controller for indicating the range of frequencies contained in said exhaust noise signal.

28. The system of claim 22, further comprising an operator-actuated switch for selectively adjusting operation of said controller.

29. The system of claim 22, wherein said controller includes a digital signal processor.

30. The system of claim 22, wherein said anti-noise signal comprises a digital pulse width modulation signal.

31. The system of claim 22, including a passive exhaust system for removing a range of high frequency signal components from said exhaust noise signal.

32. The system of claim 22, wherein said amplifier receives power from a battery recharged in conjunction with said combustion engine.

33. The system of claim 22, wherein said amplifier is a pulse width modulation amplifier.

34. An active system for altering acoustic noise generated by a source at an outlet thereof, the system comprising:

an enclosure having a first acoustic chamber in communication with an outlet positioned in a predetermined physical relationship with the source outlet, and a second chamber which is partitioned from the first acoustic chamber;

electronic circuitry associated with the second chamber of the enclosure and operative to receive a power source feedback signal from an electrical power source and generate an electrical noise alteration signal, said electronic circuitry continually adjusting for fluctuations in said power source feedback signal; and an electrical-to-acoustic signal transducer located within the second acoustic chamber of the enclosure, coupled for receipt of the electrical noise alteration signal and operative in response to the receipt to generate an acoustic noise alteration signal into the first acoustic chamber for presentation to the enclosure outlet.

35. The active system of claim 34, wherein the acoustic noise alteration signal substantially cancels the acoustic noise generated by the source.

36. The active system of claim 34, further comprising an operator-actuated switch for selectively adjusting operation of the electronic circuitry.

37. The active system of claim 34, wherein the source comprises an internal combustion engine and the outlet comprises an exhaust gas conduit having an inlet coupled to the engine and an outlet positioned in the predetermined physical relationship with the enclosure outlet for promoting acoustic coupling between the enclosure and conduit outlets.

38. The active system of claim 37, further comprising a passive noise muffler positioned for receipt of exhaust gas flow upstream of the exhaust gas conduit outlet.

39. The active system of claim 37, wherein the acoustic noise alteration signal substantially cancels the acoustic noise generated by the engine at the exhaust gas conduit outlet.

40. The active system of claim 37, further comprising an operator-actuated switch for selectively adjusting operation of the electronic circuitry.

41. An active muffler system for altering acoustic noise generated by a vehicular engine at an exhaust output thereof, the system comprising:

electronic circuitry operative to receive a power source feedback signal from an electrical power source and generate an electrical noise alternation signal, said electronic circuitry continually adjusting for fluctuations in said power source feedback signal;

an electrical-to-acoustic signal transducer coupled for receipt of the electrical noise alteration signal and operative in response to the receipt to generate an acoustic noise alteration signal at a transducer output; and an electronic switching element actuatable by a vehicle operator for selectively adjusting operation of the electronic circuitry, the electronic switching element having at least two discrete settings defining a first switching state and a second switching state.

42. The active muffler system of claim 41, wherein the electronic circuitry is operative, with the electronic switching element placed in the first switching state, to generate an electrical noise alternation signal for substantially canceling the acoustic noise at the exhaust output via the signal transducer.

43. The active muffler system of claim 42, wherein the electronic circuitry is operative, with the electronic switching element placed in the second switching state, to generate an electrical noise alteration signal for increasing the acoustic noise at the exhaust output via the signal transducer.

44. A method for producing a noise canceling signal comprising the steps of:

providing a controller for receiving an acoustic feedback signal and a power source feedback signal;

calculating an anti-noise signal in response to said acoustic feedback signal;

calculating an adjustment factor in response to fluctuations in said power source feedback signal;

adjusting a power level of said anti-noise signal in response to said power source feedback signal and said adjustment factor;

providing an amplifier for receiving said anti-noise signal and producing an amplified anti-noise signal;

providing a wave generator for receiving said amplified anti-noise signal and producing an audio anti-noise signal; and acoustically coupling said audio anti-noise signal and an exhaust noise signal for canceling said exhaust noise signal and producing an error signal.

45. The method of claim 44, further including the step of providing a microphone for receiving said error signal and generating said acoustic feedback signal, and wherein said exhaust noise signal is produced by an exhaust system.

46. The method of claim 44, wherein said controller includes a digital signal processor.

47. The method of claim 44, wherein said amplifier comprises a pulse width modulation amplifier.

48. The method of claim 44, wherein said anti-noise signal comprises a digital pulse width modulation signal.

49. The method of claim 44, wherein said wave generator includes at least one speaker having a voice coil.

50. The method of claim 45, further including an enclosure for containing said wave generator, said controller and said amplifier, said enclosure being separate from said exhaust system.

* * * * *

UNITED STATES PATENT AND TRADEMARK OFFICE

CERTIFICATE OF CORRECTION

PATENT NO. : 5,848,168

DATED : December 8, 1998

INVENTOR(S) : J. Clay Shipps and John E. Levreault, Jr.

It is certified that error appears in the above-identified patent and that said Letters Patent is hereby corrected as shown below:

Col. 1, line 48, "determined" should be --determine--.

Col. 4, line 41, delete "it".

Col. 6, line 33, "see" should be --seen--.

Col. 7, line 39, "AND" should be --A/D--.

Col. 7, line 67, "(DIPWM)" should be --(D/PWM)--.

Col. 9, line 58, "electric al" should be --electrical--.

Col. 9, line 59, "$K_{bar}$" should be --$K_{bat}$--.

Col. 10, line 7, "nth" should be --$n^{th}$--.

Col. 11, line 34, "within" should be --without--.

Col. 14, line 6, Claim 41, "alternation" should be --alteration--.

Col. 14, line 22, Claim 42, "alternation" should be --alteration--.

Signed and Sealed this

Twenty-fifth Day of May, 1999

Attest:

Q. TODD DICKINSON

*Attesting Officer* — *Acting Commissioner of Patents and Trademarks*